Feb. 11, 1930.   W. S. GARLAND   1,746,421
INTERMITTENT DRIVE FOR INDICATORS
Filed Feb. 12, 1926
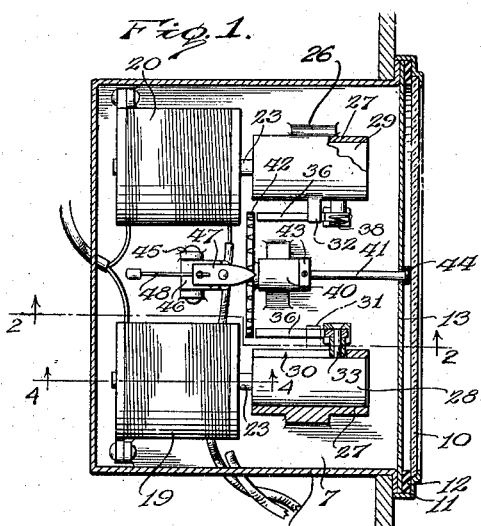
Inventor
W. S. Garland
By Lacey & Lacey, Attorneys Patented Feb. 11, 1930

1,746,421

UNITED STATES PATENT OFFICE

WALTER S. GARLAND, OF WASHINGTON, DISTRICT OF COLUMBIA

INTERMITTENT DRIVE FOR INDICATORS

Application filed February 12, 1926. Serial No. 87,873.

This invention relates to intermittent drives for indicators and while being well adapted for more or less general use, is, nevertheless, particularly designed to be employed in connection with a gage for the fuel tank of a motor vehicle.

The invention seeks, among other objects, to provide a gage which will faithfully function to accurately indicate the quantity of fuel in a fuel tank and wherein the indicator of the device may be mounted upon the instrument board or other convenient part of the vehicle so as to be within easy view of the driver.

The invention seeks, as a further object, to provide a device embodying an electrically actuated indicator adapted to be actuated as each gallon of liquid or other chosen unit of measuring of liquid is introduced into or withdrawn from a tank.

And the invention seeks, as a still further object, to provide a device which may be economically produced and readily installed.

Other objects of the invention not specifically mentioned in the foregoing will appear during the course of the following description.

In the accompanying drawings:

Figure 1 is a horizontal sectional view particularly showing the indicator.

Figure 2 is a vertical sectional view on the line 2—2 of Figure 1, looking in the direction indicated by the arrows.

Figure 3 is a transverse sectional view on the line 3—3 of Figure 2, looking in the direction indicated by the arrows.

Figure 4 is a detail sectional view on the line 4—4 of Figure 1, looking in the direction indicated by the arrows.

Figure 5 is an enlarged sectional view particularly showing one of the clicks employed.

Figure 6 is a detail sectional view on the line 6—6 of Figure 5, looking in the direction indicated by the arrows.

Referring to Figures 1, 2 and 3 of the drawings, it will be seen that the indicator actuated by my improved mechanism includes a bottom plate 7, and fitting over the bottom plate is a cover 8 mating with said plate to form a casing. In installing the device upon a motor vehicle, the indicator is preferably mounted upon the instrument board, conventionally illustrated at 9 in the drawings, and, as suggested in Figures 1 and 2, the casing is arranged to extend through the instrument board and is appropriately secured thereto. Closing the casing at its forward end is a front pane 10 secured by a clamping plate 11, and clamped beneath a suitable gasket 12 is a dial 13 which is preferably calibrated to read in terms of gallons.

Rising from the bottom plate 7 of the indicator casing near the side edges of said plate are posts 14 and fixed to said posts, as best seen in Figure 3, are parallel magnets 19 and 20. As shown in Figure 4, these magnets are provided with hollow cores 21 in the ends of which are fixed plugs 22, and slidable through said plugs are plungers 23. These plungers are provided with stop flanges 24, and acting against said flanges are springs 25 pressing the plungers forwardly to the limit of their movement. Rising from the bottom plate 7 in front of the magnets 19 and 20, are posts 26 which, as seen in Figure 6, are formed at their upper ends with sleeves 27. These sleeves are axially alined with the magnets, and slidable in said sleeves are armatures 28 and 29.

Formed in the sleeves 27 at their confronting sides are longitudinal slots 30 above which the sleeves are, as seen in Figures 1 and 5, provided with laterally projecting trip arms 31 and 32 respectively, and screwed into the armatures 28 and 29 are pivot pins 33 extending freely through said slots. Mounted upon the outer ends of said pins are depending stop plates 34 provided at their lower ends with flanges 35, and pivoted upon the pins are substantially L-shaped clicks 36 held against the stop plates by spacers 37 which are freely accommodated in the slots of the sleeves. As seen in Figure 5, the long arms of the clicks normally rest in substantially horizontal position against the flanges 35 of the stop plates 34 while the short arms of the clicks project upwardly for engagement with the trip arms 31 and 32. Secured at corresponding ends thereof to the stop plates 34 are springs 38, the opposite ends of which are fixed to the upper terminals of the short arms of the clicks for rocking the clicks downwardly to inactive position resting on the flanges 35 of the stop plates.

Rising from the bottom plate 7 of the indicator casing between the forward ends of the sleeves 27 is a post 39 provided at its upper end with a bearing sleeve 40, and journaled through said sleeve is a pointer shaft 41 which extends freely through the instrument board 9 and through the dial 13 axially of the latter. Fixed to the inner end of said shaft is a ratchet wheel 42 abutting one end of the sleeve 40, and adjustably secured on the shaft is a collar 43 abutting the other end of said sleeve for limiting the shaft against longitudinal movement. At its outer end, the shaft carries a pointer or needle 44 to cooperate with the dial 13. Formed on the bottom plate 7 rearwardly of the wheel 42, as particularly seen in Figure 2, are spaced ears 45, and pivoted at its lower end between said ears is a detent 46 which is provided at its upper end with a head 47. As seen in Figures 1 and 5, the teeth of the wheel 42 are beveled toward the rear side of the wheel while the forward end of the head 47 of the detent is substantially V-shaped to fit between any pair of said teeth. Fixed at its lower end to the bottom plate 7 is a spring 48, the upper end of which extends freely through the head of the detent to coact therewith for rocking the detent forwardly and normally holding the forward tapered end of the detent engaged between a pair of the teeth of the wheel 42.

As shown in Figures 1 and 4, the plungers 23 press against the adjacent ends of the armatures 28 and 29 for normally maintaining said armatures retracted within the sleeves 27, in which position of said armatures the short arms of the clicks 36 stand away from the trip arms 31 and 32 while the long arms of said clicks stand away from the ratchet wheel 42 of the shaft 41. Accordingly, as will be understood in view of the foregoing description, when a circuit is closed through the magnet 19, the armature 28 will be shifted toward the magnet with the result that the click 36 of said armature will be advanced to coact with the ratchet wheel 42. During the initial portion of the forward travel of the armature, the long arm of said click will be moved between a pair of the teeth of said wheel while the short arm of the click will be moved to abut the trip arm 31. Accordingly, during the latter portion of the travel of the armature, the arm 31 will coact with the short arm of the click for rocking the click, as shown in dotted lines in Figure 5, and turning the ratchet wheel. As the ratchet wheel is thus turned, the head 47 of the detent 46 will be caused to ride from between one pair of teeth of the wheel to subsequently drop between the teeth of the next adjacent pair of teeth for again locking the ratchet wheel while, when the circuit through the magnet 19 is broken, the plunger 23 of said magnet will return the armature 28 to its normal position for retracting the click. Thus, the shaft 41 will be rotated for advancing the pointer 44 one graduation on the dial for indicating an increase of one gallon of fuel. On the contrary, when a circuit is closed through the magnet 20, the armature 29 will advance the click 36 of said armature to engage the ratchet wheel 42 when said click will be rocked by the trip arm 32 for rotating the wheel. The pointer 44 will thus be counter-rotated one graduation on the dial for indicating a decrease of one gallon of fuel and, of course, upon the breaking of the circuit through the magnet 20, the plunger 23 of said magnet will, immediately return the armature 28 to normal position for retracting the click. Thus, means are provided for turning the shaft 41 step by step in either one direction or the other for registering either an increase or decrease in the quantity of fuel in the tank while the detent 46 will normally lock the shaft against movement so that the pointer will be held stationary. Any means desired may be employed to energize the magnets as fuel is poured into or withdrawn from a tank.

Having thus described the invention, what I claim is:

1. In an electrically operated indicator, a rotatable shaft, a ratchet wheel carried by said shaft and rotatable therewith, a detent cooperating with the ratchet wheel, an electro-magnet, an armature in cooperative relation with the electro-magnet, an operating member pivotally mounted upon the armature, stop means carried by the armature to normally hold the operating member in a given position, trip means between the operating member and ratchet wheel for effecting a pivotal movement of the operating member simultaneously with its advancement when the electro-magnet is energized to attract its armature, and means for returning the operating member to its initial position.

2. In an electrically operated indicator, a rotary shaft, a ratchet wheel fixed upon said shaft and rotatable therewith, a detent cooperating with the ratchet wheel, an electromagnet, a longitudinally slotted sleeve in line with the electro-magnet, an armature within the sleeve, an operating member pivoted to the armature, stop means carried by the armature to normally hold the operating member in a given position, trip means extending from the sleeve for engaging the operating member and effecting a pivotal movement of the operating member simultaneously with its advancement when the electro-magnet is energized to attract its armature, and means for returning the operating member to its initial position.

3. In an electrically operated indicator, a rotary shaft, a ratchet wheel fixed upon said shaft and rotatable therewith, a detent co-operating with the ratchet wheel, an electro-magnet having a hollow core, a spring actuated plunger within the hollow core of the magnet, a longitudinally slotted sleeve in line with the electro-magnet, an armature within the sleeve, an operating member pivoted to the armature to normally hold the operating member in a given position, trip means mounted upon the sleeve and extending transversely therefrom between the operating member and ratchet wheel for engaging the operating member and effecting a pivotal movement of the operating member simultaneously with its advancement when the electro-magnet is energized to attract its armature, and means for returning the operating member to its initial position.

4. In an electrically operated indicator, a rotatable shaft, a ratchet wheel carried by the shaft and rotatable therewith, an operating member disposed in a plane substantially parallel to said shaft and mounted to receive rectilinear and pivotal movement, an electro-magnet for advancing the operating member into engagement with said ratchet wheel, trip means between the ratchet wheel and operating member to engage the operating member and effect pivotal movement thereof during its advancement whereby to rotate the ratchet wheel when the electro-magnet is energized, and means for returning the operating member to its initial position.

5. In an electrically operated indicator, a rotatable shaft, a ratchet wheel carried by the shaft and rotatable therewith, an electro-magnet at one side of said ratchet wheel, an armature for said electro-magnet extending substantially parallel to said shaft, an operating member pivoted to said armature and extending towards said ratchet wheel, a trip between the operating member and ratchet wheel to engage the operating member and effect pivotal movement thereof during movement of the operating member towards the ratchet wheel when the electro-magnet is energized to attract the armature, and means for returning the operating member to its initial position.

In testimony whereof I affix my signature.

WALTER S. GARLAND. [L. S.]